United States Patent
Cho et al.

(10) Patent No.: US 8,582,549 B2
(45) Date of Patent: Nov. 12, 2013

(54) DOWNLINK LOCALIZED AND DISTRIBUTED MULTIPLEXING IN A FREQUENCY DIVISION MULTIPLEXING MANNER

(75) Inventors: Han Gyu Cho, Anyang-si (KR); Jin Soo Choi, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 491 days.

(21) Appl. No.: 12/919,544

(22) PCT Filed: Apr. 2, 2009

(86) PCT No.: PCT/KR2009/001699
§ 371 (c)(1),
(2), (4) Date: Aug. 26, 2010

(87) PCT Pub. No.: WO2009/145476
PCT Pub. Date: Dec. 3, 2009

(65) Prior Publication Data
US 2010/0331006 A1    Dec. 30, 2010

Related U.S. Application Data

(60) Provisional application No. 61/041,916, filed on Apr. 2, 2008.

(51) Int. Cl.
*H04B 7/208* (2006.01)
(52) U.S. Cl.
USPC .......................................................... 370/344
(58) Field of Classification Search
USPC .......................................................... 370/344
See application file for complete search history.

(56) References Cited

U.S. PATENT DOCUMENTS

| | | | |
|---|---|---|---|
| 8,279,813 B2 * | 10/2012 | Lomnitz et al. | 370/329 |
| 2006/0083210 A1* | 4/2006 | Li et al. | 370/343 |
| 2006/0199544 A1 | 9/2006 | Ramakrishna et al. | |
| 2007/0165584 A1 | 7/2007 | Ponnampalam et al. | |
| 2007/0293229 A1* | 12/2007 | Khan | 455/450 |
| 2010/0202340 A1* | 8/2010 | Josiam et al. | 370/312 |
| 2011/0065468 A1* | 3/2011 | Parkvall et al. | 455/509 |

FOREIGN PATENT DOCUMENTS

| | | |
|---|---|---|
| JP | 2005-311413 A | 11/2005 |
| JP | 2007-134809 A | 5/2007 |
| WO | WO 2007-060093 A1 | 5/2007 |
| WO | WO2007/082754 A1 | 7/2007 |

OTHER PUBLICATIONS

Huiling Jia, On the performance of IEEE 802.16 OFDMA system under different frequency reuse and subcarrier permutation patterns, Jun. 24-28, 2007, pp. 5720-5725.*

* cited by examiner

*Primary Examiner* — Mark Rinehart
*Assistant Examiner* — Maharishi Khirodhar
(74) *Attorney, Agent, or Firm* — McKenna Long & Aldridge LLP

(57) ABSTRACT

A method of signaling system configuration information in a wireless mobile cellular communication system is disclosed. The method comprises transmitting the system configuration information at every predetermined period. In this case, each downlink subframe is divided into a plurality of frequency partitions, and subcarriers from at least two of the plurality of frequency partitions are allocated to a first mobile station using distributed resource allocation.

11 Claims, 8 Drawing Sheets

(F=F1+F2+F3)

DOWNLINK LOCALIZED AND DISTRIBUTED MULTIPLEXING IN A FREQUENCY DIVISION MULTIPLEXING MANNER

This application is a national phase application based on International Application No. PCT/KR2009/001699, filed on Apr. 2, 2009, which claims priority to U.S. Provisional Application No. 61/041,916, filed on Apr. 2, 2008, all of which are incorporated by reference for all purposes as if fully set forth herein.

TECHNICAL FIELD

The present invention relates to a method of multiplexing distributed frequency resources and localized (i.e., contiguous) frequency resources, particularly for a wireless mobile cellular communication system adapting fractional frequency reuse (FFR) scheme.

BACKGROUND ART

Frequency Division Multiple Access or FDMA is a channel access method used in multiple-access protocols as a channelization protocol. FDMA gives users an individual allocation of one or several frequency bands, allowing them to utilize the allocated radio spectrum without interfering with each other. Multiple access systems coordinate access between multiple users. The users may also share access via different methods such time division multiple access (TDMA), code division multiple access (CDMA), or spatial division multiple access (SDMA). These protocols are utilized differently, at different levels of the theoretical OSI model.

Frequency bands are allocated either in distributed manner or in localized manner in frequency domain. In other words, frequency resource allocation is largely classified into localized resource allocation and distributed resource allocation.

Localized resource allocation generally refers to a method for allocating a plurality of subcarriers which are contiguous in physical domain to a single user. Scheduling gain, such as multi-user diversity gain, can be achieved by localized resource allocation.

In contrast, distributed resource allocation refers to a method for allocating a plurality of subcarriers which are not contiguous in physical domain to a single user. Frequency diversity may be achieved by distributed resource allocation.

Resource allocation can be performed in units of a resource unit (RU) or a set of RUs. A RU consists of M subcarriers in frequency domain, and of N orthogonal frequency division multiple access (OFDMA) symbols in time domain. For example, a RU may consist of 18 (M=18) subcarriers by 6 (N=6) OFDMA symbols. The plurality of subcarriers constituting a RU may or may not be contiguous in physical frequency domain. The plurality of OFDMA symbols constituting a RU is contiguous in physical time domain.

A RU is classified into one of localized RU and distributed RU (DRU). A localized RU is composed of a plurality of subcarriers which are contiguous in physical frequency domain, and can be used for the localized resource allocation. A distributed RU is composed of a plurality of subcarriers which are not contiguous in physical frequency domain, and can be used for the distributed resource allocation. The term "localized RU" may also called as "contiguous RU (CRU)".

Above mentioned RUs are used for IEEE Standard 802.16. IEEE Standard 802.16 is a product of IEEE 802.16 Working Group on Broadband Wireless Access Standards, which was established by IEEE Standards Board in 1999, to develop standards for the global deployment of broadband Wireless Metropolitan Area Networks. The Workgroup is a unit of the IEEE 802 LAN/MAN Standards Committee.

Although the 802.16 family of standards is officially called WirelessMAN in IEEE, it has been commercialized under the name "WiMAX" (from "Worldwide Interoperability for Microwave Access") by the industry alliance called the WiMAX Forum. The mission of the Forum is to promote and certify compatibility and interoperability of broadband wireless products based on the IEEE 802.16 standards.

The most popular IEEE 802.16 standard is IEEE Std 802.16e-2005 Amendment (hereinafter 16e) that is widely being deployed around the world in more than 100 countries by more than 300 operators. 16e was completed in 2005 and the WiMAX Forum certified products were released starting 2007.

According to 16e, a localized RU and a distributed RU is distinguished by time zone in a frame defined by 16e. That is, a localized RU and a distributed RU are multiplexed in time division multiplexing (TDM) manner as shown in FIG. 1. FIG. 1 shows an exemplary frame structure use in IEEE Standard 802.16e.

If a localized RU and a distributed RU are multiplexed in TDM manner as in 16e, the flexibility of the ratio of the number of users using localized RUs to the number of users using distributed RUs generally decreases. Therefore, in a view of the flexibility of the localized RU users and the distributed RU users mixing ratio, it is beneficial to multiplexing a localized RU and a distributed RU in a sub-frame in time division multiplexing (TDM) manner, which is adapted in $3^{rd}$ generation project partnership long term evolution (3GPP LTE) as known in the wireless communication industry. Herein, the sub-frame is a set of time contiguous OFDMA symbols which constitutes a radio frame.

Generally, in order to design a FDM multiplexing scheme for multiplexing localized RUs and distributed RUs, it can be considered followings; first, scheduling gain of localized RU users; second, frequency diversity gain of distributed RU users; third, signaling overhead, and last, scheduling diversity.

In particular, for the case that logical frequency bands are divided into several logical frequency zones (LFZ) as in fractional frequency reuse (FFR) scheme, it is necessary to develop an effective FDM scheme for localized and distributed RUs. The term "logical frequency zone" may be also called as "frequency partition" hereinafter.

DISCLOSURE OF INVENTION

Technical Problem

An object of the present invention is to provide an effective FDM scheme for localized and distributed RUs.

Technical Solution

In an aspect of the invention, there is a method of signaling system configuration information in a wireless mobile cellular communication system. The method comprises transmitting, at a base station of a cell, the system configuration information at every predetermined period, wherein each downlink subframe is divided into a plurality of frequency partitions, and subcarriers from at least two of the plurality of frequency partitions are allocated to a first mobile station using distributed resource allocation.

Preferably, a localized subchannel and a distributed subchannel coexist in at least one of the plurality of frequency partitions.

Preferably, subcarriers only from one of the plurality of frequency partitions are allocated to a second mobile station using localized resource allocation.

Preferably, the predetermined period is a period of a first frame of 20 ms in time length.

Preferably, the predetermined period is a period of a second frame of 5 ms in time length.

Preferably, the predetermined period is a period of a third frame which is a basic time unit constituting a second frame of 5 ms in time length.

Preferably, the system configuration information is transmitted by broadcasting.

Preferably, the system configuration information is transmitted by multicasting.

Preferably, the system configuration information is transmitted by dedicated transmission.

Preferably, the system configuration information includes paring information about which ones of the plurality of frequency partitions are paired for allocation to the first mobile station using distributed resource allocation.

Preferably, the method further comprises transmitting, at the base station, paring information about which ones of the plurality of frequency partitions are paired for allocation to the first mobile station using distributed resource allocation.

In another aspect of the invention, there is a method of signaling system configuration information in a wireless mobile cellular communication system. The method comprises transmitting, at a base station of a cell, the system configuration information at every predetermined period, wherein, each downlink subframe is divided into at least a first frequency partition corresponding to a first sector of the cell and a second frequency partition corresponding to a second sector of the cell, and at least a subcarrier from the second frequency partition is allocated to a mobile station of the first sector wherein the mobile station uses distributed physical resource units.

Advantageous Effects

According to the present invention, frequency resources are effectively used for a wireless mobile cellular communication system supporting FFR scheme.

According to the present invention, the technical effects achievable through FFR scheme can be maximized.

According to the present invention, distributed subchannels for a user are selected from at least one logical frequency zone (LFZ). Therefore, frequency diversity gain can be effectively obtained and the frequency partition effect is effectively used.

When allocating distributed RUs and localized RUs to MSs, the distributed RUs may be allocated either after or before the localized RUs are allocated. The present invention can be applied to both cases and for the other various FDM multiplexing schemes.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
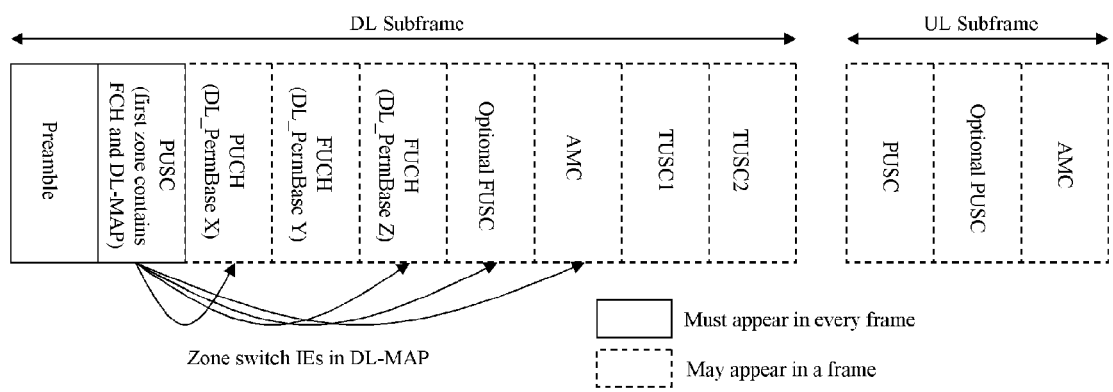
FIG. 1 shows an exemplary frame structure use in IEEE Standard 802.16e.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In wireless communications, diversity gain is the increase in signal-to-interference ratio due to some diversity scheme, or how much the transmission power can be reduced when a diversity scheme is introduced, without a performance loss.

In telecommunications, a diversity scheme refers to a method for improving the reliability of a message signal by utilizing two or more communication channels with different characteristics. Diversity plays an important role in combating fading and co-channel interference and avoiding error bursts. It is based on the fact that individual channels experience different levels of fading and interference. Multiple versions of the same signal may be transmitted and/or received and combined in the receiver.

Frequency diversity is one of diversity schemes in which a signal is transferred using several frequency channels or spread over a wide spectrum that is affected by frequency-selective fading.

Scheduling gain can be obtained by first acquiring downlink channel status information in units of, such as, a RU or a group of RUs, and then selecting a optimum channel for a user to transmit a downlink signal. On the other hand, frequency diversity gain can be obtained by randomly distributing subcarriers allocated for a user across frequency axis so as not to allow all of the distributed subcarriers to simultaneously experience a deep fading.

To obtain diversity gain, resource units (RUs) of frequency/time domain can be spread along a frequency axis by a predetermined permutation rule which is for obtaining frequency diversity gain. In this document the term "resource unit (RU)" may be referred to as "resource block (RB)".

In a system adopting OFDMA, a resource unit typically indicates a set of resource elements comprising $P_{sc}$ subcarriers by $N_{sym}$ consecutive OFDMA symbols. Resource units are usually classified into a physical resource unit (PRU) type and a logical resource unit (LRU) type. A PRU is the basic physical unit for resource allocation that comprises $P_{sc}$ consecutive subcarriers by $N_{sym}$ consecutive OFDMA symbols. A LRU is the basic logical unit for distributed and localized resource allocations. A PRU or LRU can be indexed by the frequency value of the subcarrier the PRU or LRU represents for.

$P_{sc}$ may be 18 and $N_{sym}$ may be 6 or 7. A logical resource unit (LRU) refers to the basic logical unit for distributed and localized resource allocations. A LRU may be $P_{sc} \cdot N_{sym}$ subcarriers. The LRU may include the pilots in, which are used in a PRU. The effective number of subcarriers in an LRU depends on the number of allocated pilots.

Permutation relates to the notion of mapping the elements of a set to other elements of the same set, i.e., exchanging (or "permuting") elements of a set. Alternatively, permutation can be regarded as assignment operations, with the indexes of a set of the PRUs assigned to the indexes of a set of the LRUs. Generally, each index is assigned only once.

A distributed resource unit (DRU) refers to a resource unit which contains a group of subcarriers which are spread across the distributed resource allocations within a frequency partition. The size of the DRU equals the size of PRU, i.e., $P_{sc}$ subcarriers by $N_{sym}$ OFDMA symbols. The minimum unit for forming the DRU may be equal to a pair of subcarriers, called tone-pair.

A localized resource unit or contiguous resource unit (CRU) refers to a resource unit which contains a group of subcarriers which are contiguous across the localized resource allocations. The size of the CRU equals the size of the PRU, i.e., $P_{sc}$ subcarriers by $N_{sym}$ OFDMA symbols.

Downlink data transmission from a base station to a specific terminal or uplink data transmission from the specific terminal to the base station is made through one or more LRUs. When the base station transmits data to the specific terminal, it has to notify the terminal of which one of the LRUs is used for data transmission. Also, in order to enable the specific terminal to transmit data, the base station has to notify the terminal of which one of the LRUs is allowed to use for data transmission.

Data transmission schemes can be broadly classified into a frequency diversity scheduling (FDS) scheme and a frequency selective scheduling (FSS) scheme. The FDS scheme is a scheme that obtains a reception performance gain using frequency diversity, and the FSS scheme is a scheme that obtains a reception performance gain using frequency selective scheduling.

In the FDS scheme, a transmitter transmits one data packet over subcarriers widely distributed in a system frequency domain so that symbols in the data packet can experience various radio channel fadings. Therefore, an improvement in reception performance is obtained by preventing the entire data packet from being subject to unfavorable fading. In contrast, in the FSS scheme, an improvement in reception performance is obtained by transmitting the data packet over one or more contiguous frequency areas in the system frequency domain which are in a favorable fading state.

In a cellular OFDMA wireless packet communication system, a plurality of terminals is present in a cell. At this time, because the radio channel conditions of the respective terminals have different characteristics, it is desirable to use the FDS scheme with respect to a certain terminal and to use the FSS scheme with respect to a different terminal even within a subframe. As a result, a FDS scheme and a FSS scheme must be designed such that the two schemes can be efficiently multiplexed within a subframe.

In the FSS scheme, a gain can be obtained by selectively using a band favorable to a UE among all available bands, thus, evaluation of the condition of each band is required for the FSS scheme. In contrast, in the FDS scheme, an evaluation is not made as to whether a specific band is good or bad, and, as long as a frequency separation capable of adequately obtaining diversity is maintained, there is no need to select and transmit a specific frequency band. Accordingly, it is advantageous to an improvement in entire system performance to perform the frequency selective scheduling of the FSS scheme preferentially when scheduling.

In the FSS scheme, because data is transmitted using subcarriers consecutively contiguous in the frequency domain, it is preferable that the data is transmitted using CRUs. At this time, provided that $N_{PRU}$ PRUs are present in one subframe and a maximum of $N_{CRU}$ CRUs are available within the system, the base station can transmit bitmap information of $N_{CRU}$ bits to each terminal to notify the terminal of which one of the CRUs through which downlink data will be transmitted or which one of the CRUs through which uplink data can be transmitted. That is, each bit of the $N_{CRU}$ bit bitmap information, which is transmitted to each terminal as scheduling information, indicates whether data will or can be transmitted through an CRU corresponding to this bit, among the $N_{CRU}$ CRUs. This scheme is disadvantageous in that, when the number $N_{CRU}$ becomes larger, the number of bits to be transmitted to each terminal becomes larger in proportion thereto.

Meanwhile, in a system adapting OFDAM scheme, subchannels may be mapped by one of so-called full usage of subchannel (FUSC) scheme, partial usage of subchannel (PUSC) scheme, and adaptive modulation and coding (AMC) scheme.

Among these, PUSC scheme refers to a method in which only part of the entire system bandwidth is used at a time. In PUSC scheme, available subcarriers are divided into subchannels. A subchannel contains pilot subcarriers at a predetermined location, and the remaining subcarriers are used for data transmission. For example, if a base station supports up to three sectors (alpha, beta, gamma), a PUSC scheme may segments the entire available subcarriers into three segmentations. If the entire system bandwidth is 10 MHz, the alpha sector only uses the first segmentation, the beta sector only uses the second segmentation, and the gamma sector only uses the third segmentation. In this case, because subcarriers are orthogonal to each other, interference between sectors does not exist.

Figure 2:
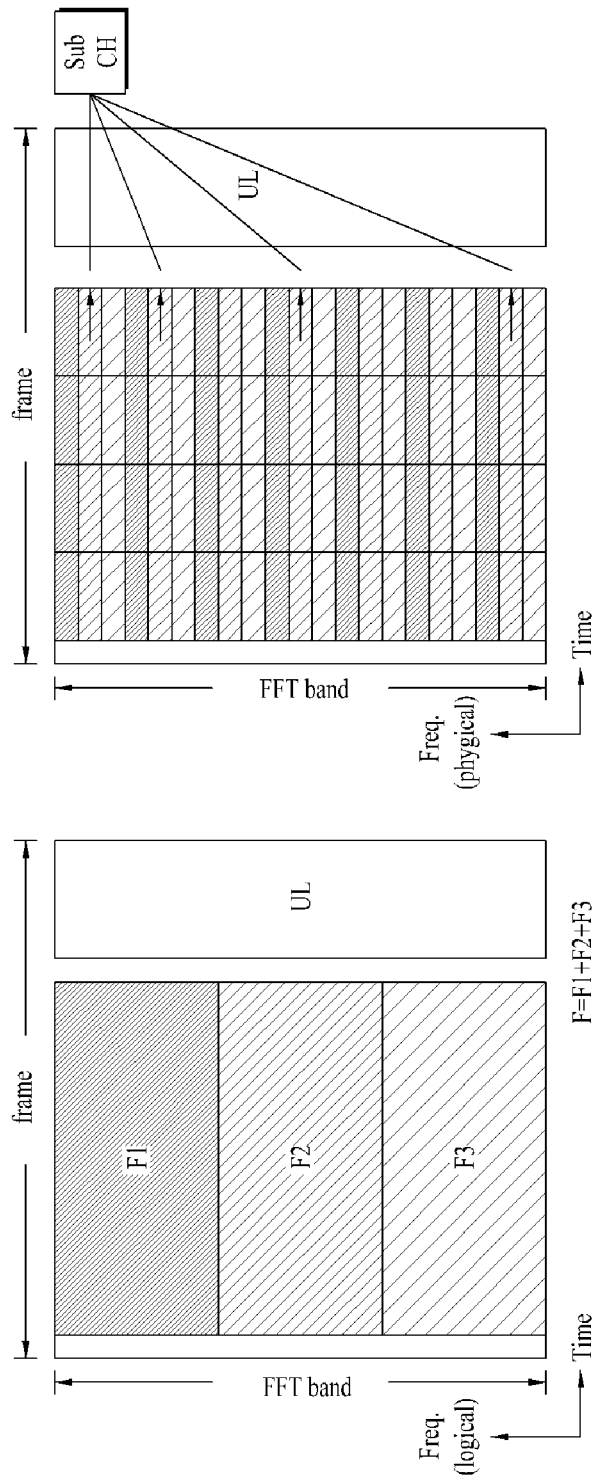
FIG. 2 shows an exemplary segmentation of time-frequency resources for PUSC method.

FIG. 2 shows an exemplary segmentation of time-frequency resources for PUSC method.

Referring to FIG. 2, the total frequency band is divided into 3 segments and each of which can be allocated for each sector of a cell with 3 sectors.

Above described PUSC scheme can be extended to a flexible frequency reuse (FFR) scheme in a cellular system, which can increase cell capacity and quality of service of a user. With FFR scheme, for example, the users located near the base station are provided a service using entire available subcarriers, i.e., frequency reuse factor of 1, for maximizing cell capacity, whereas other users located at cell edges, who are expected to experience inter cell interferences, are provided a service using part of entire available subcarriers, i.e., for example frequency reuse factor of 3 for reducing inter cell interferences.

Figure 3:
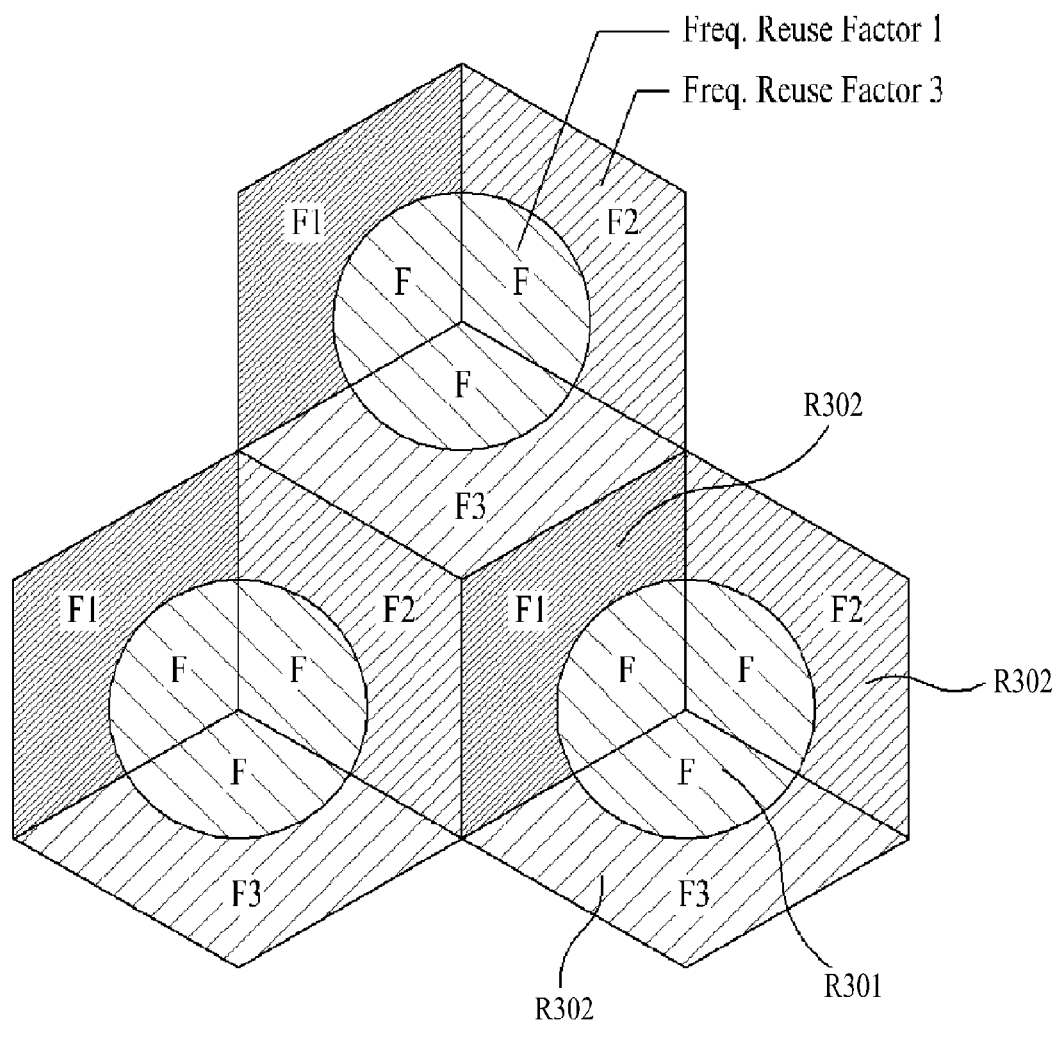
FIG. 3 shows an exemplary FFR configuration in a cellular system.

FIG. 3 shows an exemplary FFR configuration in a cellular system.

Region R301 is a region where frequency reuse factor of 1 is used, and region R302 is a region where frequency reuse factor of 3 is used.

According to the present invention, each subframe is divided into several frequency partitions; each frequency partition consists of a set of physical resource units across the total number of OFDMA symbols available in the subframe. Each frequency partition can include contiguous (localized) and/or non-contiguous (distributed) physical resource units. Each frequency partition can be used for FFR as mentioned above. Hereinafter, the features of the this embodiment will be explained in detail with reference to the accompanying drawings.

Figure 4:
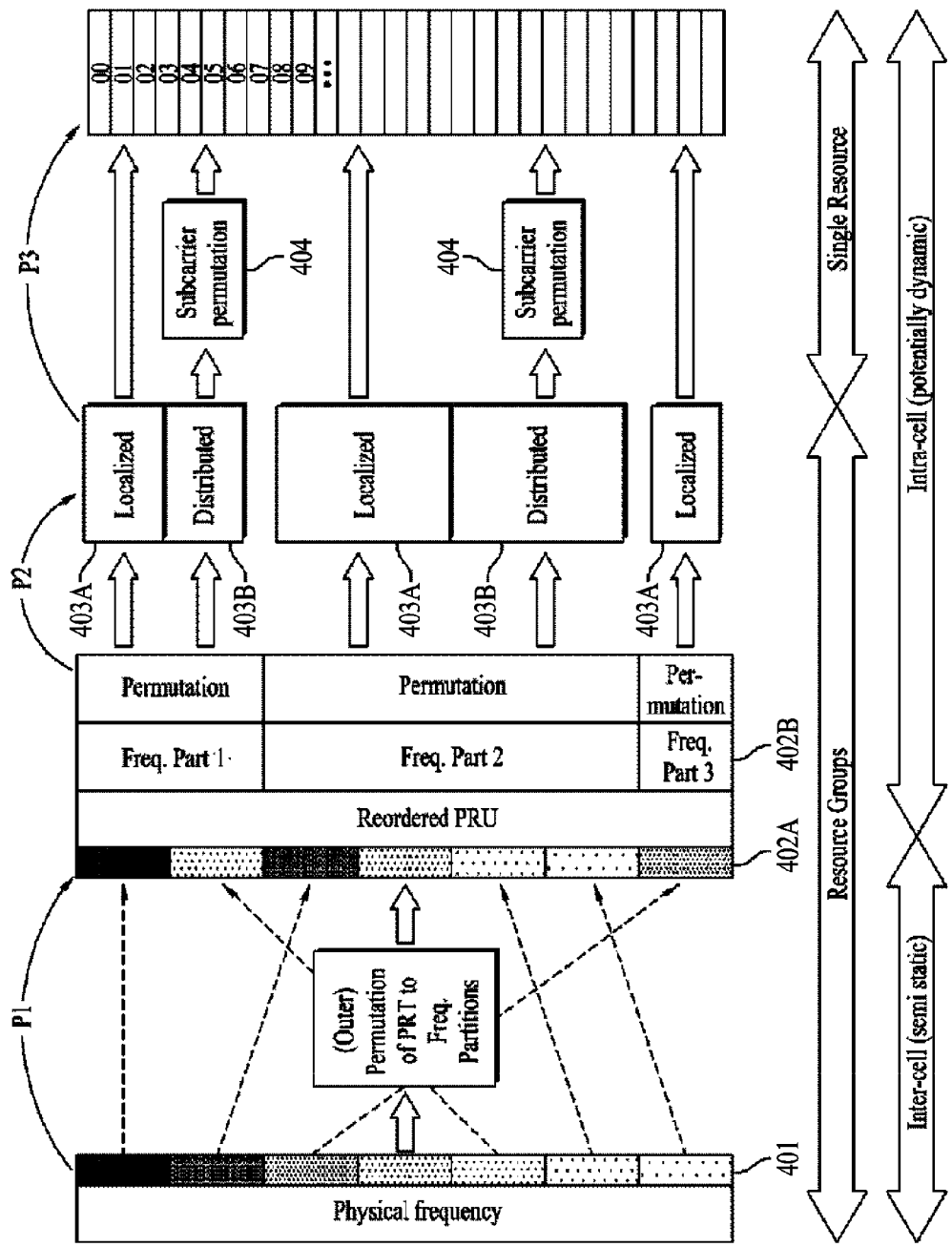
FIG. 4 is a conceptual diagram illustrating subcarrier to resource mapping procedure according to one embodiment of the present invention.

FIG. 4 is a conceptual diagram illustrating subcarrier to resource mapping procedure according to one embodiment of the present invention.

Referring to FIG. 4, block 401 represents a set of consecutive PRUs in a physical domain. The set of consecutive PRUs are first permuted to form a set of reordered PRUs 402A. Then, the set of reordered PRUs 402A are allocated to several frequency partitions as shown by 402B, for example a first frequency partition (Freq. Part1), a second frequency partition (Freq. Part2), a third frequency partition (Freq. Part3) as shown in FIG. 4. Herein, each frequency partition may be reserved for the FFR group for each sector in a cell. In each frequency partition, a part of the reordered PRUs 402A is allocated for localized permutation 403A, in which resource units are reserved for contiguous resource mapping, and the remaining other part of the reordered PRUs 402A is allocated for distributed permutation 403B, in which resource units are reserved for distributed resource mapping. Then, the resource units can be distributed by subcarrier permutation 404.

As described above, subcarrier to resource mapping according to the above embodiment of the present invention includes a first permutation P1 of PRUs 401 onto reordered PRUs 402A, a second permutation P2 performed within each frequency partition, and a third permutation P3 in units of subcarriers. By the first permutation P1, the PRUs are distributed to each frequency partition. By the second permutation P2, the indexes of reordered PRUs are renumbered for each frequency partition. During the renumbering, PRUs may be distributed to localized resources or to distributed resources. By the third permutation P3, subcarriers are distributed to subchannels (LRU). Although the first permutation P1 and the second permutation P2 are performed in separation in the FIG. 4, the first permutation P1 and the second permutation P2 can be performed by a single process. Hereinafter, the permutation comprised of the first permutation P1 and the second permutation P2 is referred to as "outer permutation" in this application so as to distinguish it with the third permutation P3.

In the present invention, the total number of resource units constituting the whole system band may be 24 for 5 MHz system bandwidth, 48 for 10 MHz system bandwidth, and 96 for 20 MHz system bandwidth. Each physical resource unit may be mapped to a corresponding frequency partition according to a predetermined permutation rule.

The outer permutation may be performed in units of N resource units. Herein, 'N' represents the minimum granularity for the outer permutation. For example, supposing that the system bandwidth is 10 MHz, and N equals 2, a total of 48 RUs are contiguously paired in units of 2 RUs. 'N' may have value of one or other natural number.

Figure 5:
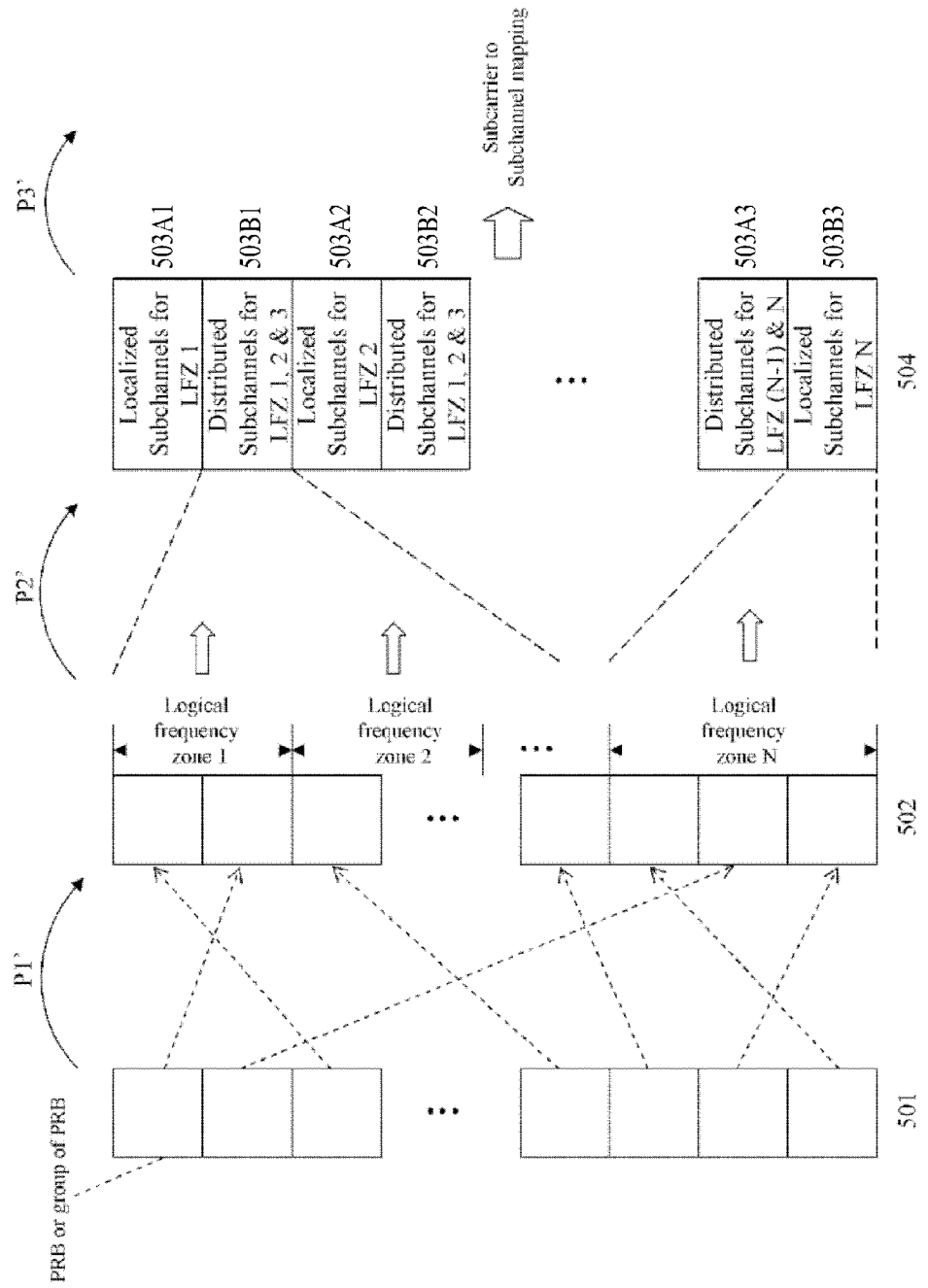
FIG. 5 is a conceptual diagram illustrating physical resource to logical resource mapping procedure according to another embodiment of the present invention.

FIG. 5 is a conceptual diagram illustrating physical resource to logical resource mapping procedure according to another embodiment of the present invention. In the following paragraph, correspondences between FIG. 4 and FIG. 5 will be described.

Block 501 of FIG. 5 corresponds to block 401 of FIG. 4, block 502 of FIG. 5 corresponds to block 402A and 402B of FIG. 4, and block 504 of FIG. 5 corresponds to block 405 of FIG. 4. "Logical frequency zone x (LFZ x)" in block 502 corresponds to "Freq. Part x" ("Frequency partition x") of block 402b in FIG. 4. Blocks 503A1, 503A2, and 503A3, which are comprised of localized subchannels, correspond to blocks 403A of FIG. 4. Blocks 503B1, 503B2, and 503B3, which are comprised of distributed sub-channels, correspond to blocks 403B of FIG. 4. P1, P2, and P3 of FIG. 4 correspond to P1', P2', and P3' of FIG. 5, respectively. It can be easily understood that some parts of FIG. 4 is not shown in FIG. 5.

The embodiment of FIG. 5 is the same as that of FIG. 4, except that the second permutation P2' of FIG. 5 is different from the second permutation P2 of FIG. 4.

In FIG. 5, block 503Bx (x=1, 2, or 3) consists of PRUs only from a single LFZ x (e.g., x=1 for block 503B1, x=2 for block 503B2, and x=3 for block 503B3) or PRUs from more than one LFZs including at least one LFZ other than LFZ x (e.g., LFZ 1, 2, & 3 for block 503B1, LFZ 1, 2, & 3 for block 503B2, and LFZ 1, (N−1) & N for block 503B3). It can be seen that FIG. 5 shows the latter as an example. Therefore, resources either from several frequency partitions or only from one frequency partition may be allocated to a mobile station using distributed subchannels.

In contrast, according to the method of FIG. 4, distributed subchannels 403B for frequency partition x (i.e., "LFZ x" of FIG. 5) consists of PRUs only from frequency partition x. Therefore, resources only from one frequency partition are allocated to a mobile station using distributed subchannels according to FIG. 4.

However, it should be understood that block 503Ax consists of PRUs only from LFZ x (e.g., x=1 for block 503A1, x=2 for block 503A2, and x=3 for block 503A3), which is similar to FIG. 4 in that localized subchannels 403A for frequency partition x (i.e., "LFZ x" of FIG. 5) consists of PRUs only from frequency partition x. Therefore, resources only from one frequency partition are allocated to a mobile station using localized subchannels according to both FIG. 4 and FIG. 5.

According to other embodiment of the present invention, the physical-to-logical mapping relationship (i.e., configuration information about logical frequency partition or logical frequency zone) obtained by the above described methods may be signaled from a base station (BS) to a mobile station (MS). Such a signaling may be carried on a super frame header (SFH) which will be explained hereinafter.

Figure 6:
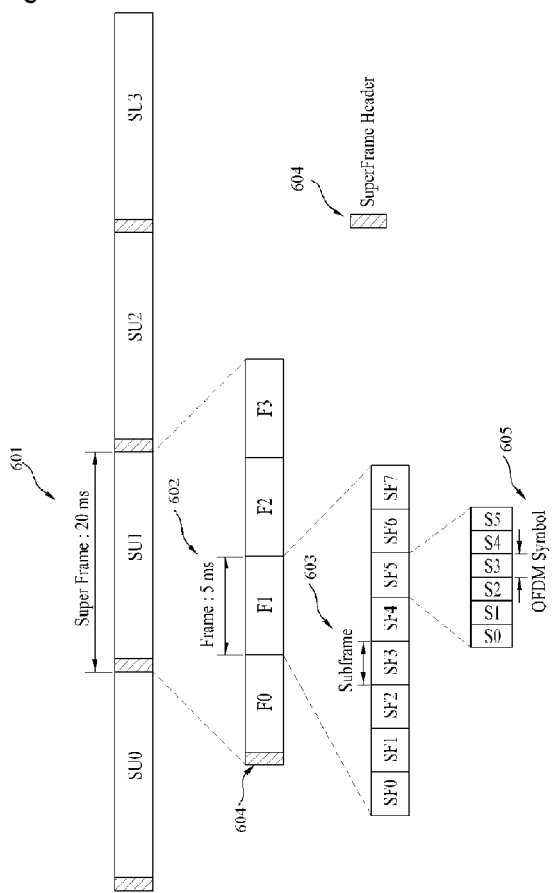
FIG. 6 shows a basic frame structure for the present invention.

FIG. 6 shows a basic frame structure for the present invention.

The super frame 601 indicates a structured data sequence of fixed duration. The super frame 601 may be comprised of four frames 602. The super frame 601 may be 20 ms in time length. Each 20 ms super frame 601 may be divided into four equally-sized 5 ms frames 602. Each 5 ms frame 602 may further consist of eight subframes 603. A subframe 603 is assigned for either downlink (DL) or uplink (UL) transmission.

Referring to FIG. 6, every super frame 601 may include a SFH 604. The SFH 604 may be located in the first downlink (DL) subframe of the super frame, and include broadcast channels. Generally, the SFH may be transmitted every super frame. Every subframe may have six OFDM symbols 605 as depicted in FIG. 6, or may have seven OFDM symbols although not shown.

According to one embodiment of the present invention, configuration information about the logical frequency partition may be carried on the SFH and be broadcast from a BS to a MS every super frame or every multiple of a super frame. The configuration information may include the number of frequency partitions, the size of each of the frequency partition, etc.

According to other embodiment of the present invention, the configuration information about the logical frequency partition may be broadcast at a longer period than the time length of a super frame. For example, the UL system configuration information may be broadcast every DCD/UCD interval, which is usually longer than the length of a super frame, or every multiple of DCD/UCD interval. Herein, the DCD refers to a downlink channel descriptor which is a MAC message that describes the PHY characteristics of a downlink, and the UCD refers to an uplink channel descriptor which is a MAC message that describes the PHY characteristics of an uplink, both of which are defined in IEEE Standard 802.16-2004.

According to other embodiment of the present invention, the configuration information about the logical frequency partition is predetermined and not signaled to a MS, with the configuration information being shared with a BS and a MS.

According to one embodiment of the present invention, configuration information about distributed subchannel paring, which indicates which one of the plurality of logical frequency zones are paired to constitute each of the distributed subchannels 503B.

The configuration information about distributed subchannel paring may be carried on a SFH and be broadcast from a BS to a MS every super frame or every multiple of a super frame. Otherwise, the configuration information about the distributed subchannel paring may be broadcast at a longer period than the time length of a super frame. For example, the UL system configuration information may be broadcast every DCD/UCD interval or every multiple of DCD/UCD interval, as mentioned above. Otherwise, the configuration information about the distributed subchannel paring may be predetermined and not signaled to a MS, with the configuration information being shared with a BS and a MS. Or, despite of excessive signaling overhead, the configuration information about the distributed subchannel paring may be transmitted every frame.

According to one embodiment of the present invention, configuration information about the number and location of distributed subchannels and/or the location of localized subchannels is signaled from a BS to a MS.

A BS can broadcast configuration information about distributed subchannels and localized subchannels to a MS according to a scheduling period. Otherwise, the BS can multicast the configuration information per each corresponding user group (e.g., a user group that uses the same LFZs). Above configuration information can be signaled every frame or every sub-frame.

According to other embodiment of the present invention, information about resource allocation is signaled in dedicated manner from a BS to a MS per each user.

In this embodiment, the BS may transmit the following information to each MS:

information about which one of the LFZs a MS belongs to
information about which one among localized RUs and distributed RUs a MS uses
the logical subchannel number allocated to a MS The transmission period of the above information may be set to the same as the transmission period of the configuration information about distributed subchannels and localized subchannels.

Figure 7:
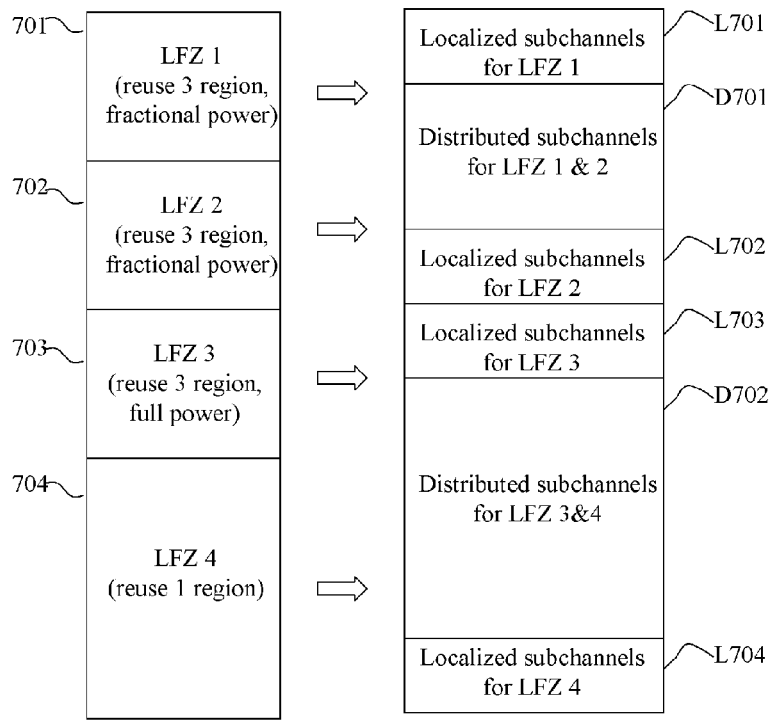
FIG. 7 shows an exemplary distribution of RUs to localized subchannels and distributed subchannels according to one embodiment of the present invention.

FIG. 7 shows an exemplary distribution of RUs to localized subchannels and distributed subchannels according to one embodiment of the present invention.

Referring to FIG. 7, it is shown that the whole system band is divided into four (4) LFZs in consideration of frequency reuse factor 1 region and frequency reuse factor 3 region. Each of LFZ 1 701, LFZ 2 702, and LFZ 3 703 is a frequency reuse factor 3 region, and LFZ 4 704 is a frequency reuse factor 1 region. Fractional transmission power is used for LFZ 1 701 and LFZ 2 702, and full transmission power is used for LFZ 3 703. Localized subchannels L701 are comprised of RUs from LFZ 1 701, localized subchannels L702 are comprised of RUs from LFZ 2 702, localized sub-channels L703 are comprised of RUs from LFZ 3 703, and localized subchannels L704 are comprised of RUs from LFZ 4 704. Distributed subchannels D701 are comprised of RUs from LFZ 1 701 and LFZ 2 702, and distributed subchannels D702 are comprised of RUs from LFZ 3 703 and LFZ 4 704.

Full transmission power may be used for LFZ 3 703 among frequency reuse factor 3 regions. On the other hand, a fraction of full transmission power may be used for LFZ 1 701 and LFZ 2 702 among frequency reuse factor 3 regions. Typically, full transmission power is used for cell edge users, and a fraction of full transmission power is used for the users using soft FFR. In the example shown in FIG. 11, soft FFR is used for LFZ 1 701 and LFZ 2 702.

The resources from LFZ 1 701 and LFZ 2 702 which use soft FFR are paired to constitute distributed subchannels D701, and the resource from LFZ 3 703 and LFZ 4 704 which use full power are paired to constitute distributed subchannels D702. According to this embodiment, frequency diversity gain achieved by distributed sub-channels is increased. However, cell edge users interrupting frequency reuse factor 1 region rarely hits each other between different cells, meaning that loss due to interference between cell edge users is not be significant.

Figure 8:
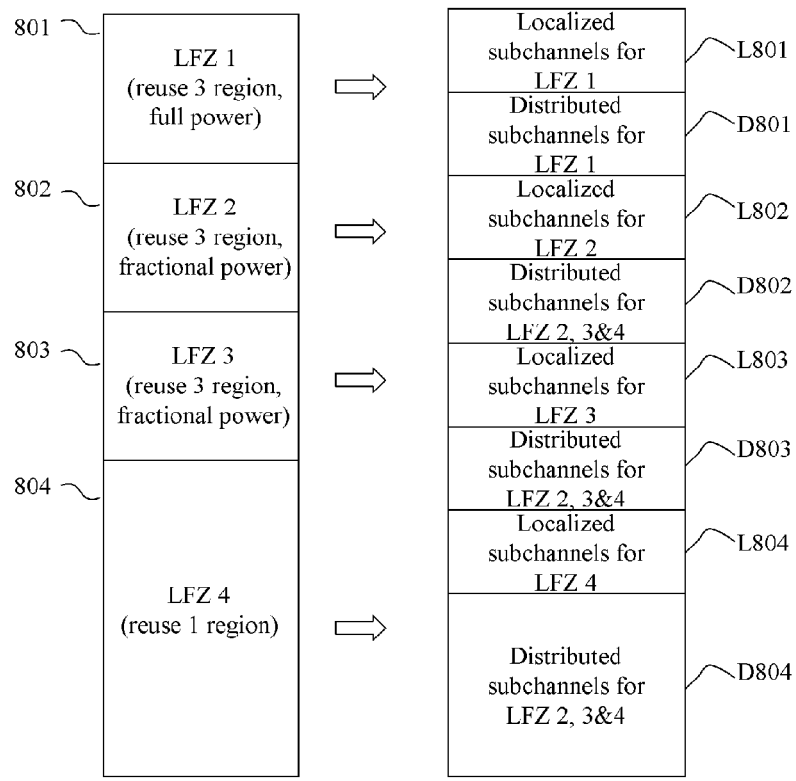
FIG. 8 shows an exemplary distribution of RUs to localized subchannels and distributed subchannels according to another embodiment of the present invention.

FIG. 8 shows an exemplary distribution of RUs to localized subchannels and distributed subchannels according to another embodiment of the present invention.

Referring to FIG. 8, it is shown that the whole system band is divided into four (4) LFZs in consideration of frequency reuse factor 1 region and frequency reuse factor 3 region. Each of LFZ 1 801, LFZ 2 802, and LFZ 3 803 is a frequency reuse factor 3 region, and LFZ 4 804 is a frequency reuse factor 1 region. Fractional transmission power is used for LFZ 2 802 and LFZ 3 803, and full transmission power is used for LFZ 1 801. Localized subchannels L801 are comprised of RUs from LFZ 1 801, localized subchannels L802 are comprised of RUs from LFZ 2 802, localized sub-channels L803 are comprised of RUs from LFZ 3 803, and localized subchannels L804 are comprised of RUs from LFZ 4 804. Distributed subchannels D801 are comprised of RUs from LFZ 1 801, distributed subchannels D802 are comprised of RUs from LFZ 2 802, LFZ 3 803, and LFZ 4 804, distributed subchannels D803 are comprised of RUs from LFZ 2 802, LFZ 3 803, and LFZ 4 804, and distributed subchannels D804 are comprised of RUs from LFZ 2 802, LFZ 3 803, and LFZ 4 804.

The resources from LFZ 1 801, where cell edge users transmit signals with full power, constitute distributed subchannels D801, and the resource from LFZ 2 802, LFZ 3 803 and LFZ 4 804 are paired to constitute distributed subchannels D802, D803, and D804. Frequency diversity of LFZ 2 802, LFZ 3 803, and LFZ 4 804 can be increased without further interfering edge users of other cells because non-edge users exist in LFZ 2 802, LFZ 3 803, and LFZ 4 804.

Figure 9:
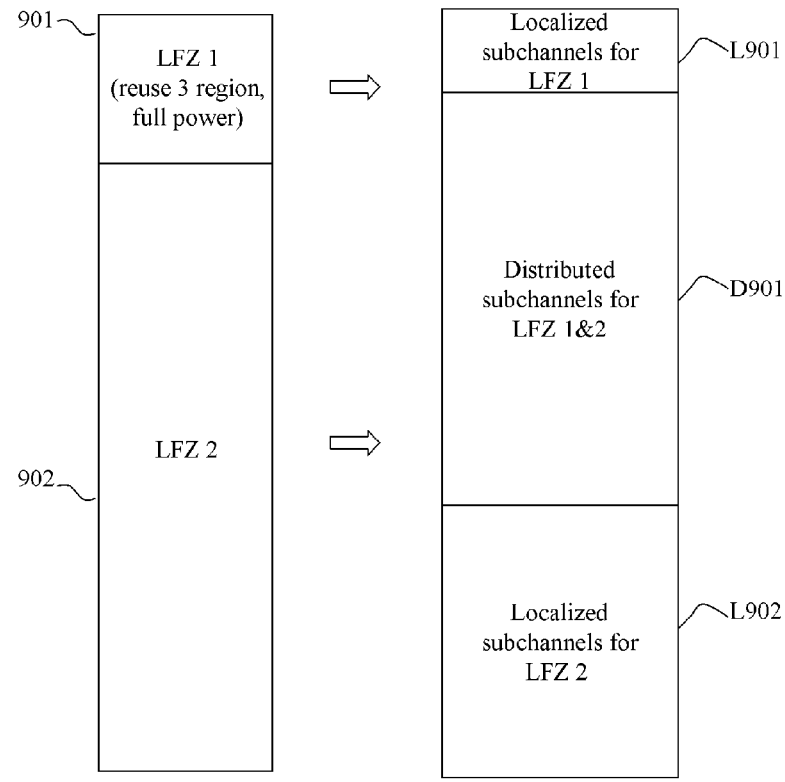
FIG. 9 shows an exemplary distribution of RUs to localized subchannels and distributed subchannels according to another embodiment of the present invention.

FIG. 9 shows an exemplary distribution of RUs to localized subchannels and distributed subchannels according to another embodiment of the present invention.

Referring to FIG. 9, it is shown that the whole system band is divided into two (2) LFZs, LFZ 1 901 using frequency reuse factor 3 and full power transmission, and LFZ 2 902. Localized subchannels L901 are comprised of RUs from LFZ 1 901, and localized subchannels L902 are comprised of RUs from LFZ 2 902. Distributed sub-channels D901 are comprised of RUs from LFZ 1 901 and LFZ 2 902.

The resources from the whole system band, that is from LFZ 1 901 and LFZ 2 902, are paired to constitute distributed subchannels D901. According to this embodiment, FFR gain can be maximized for localized subchannels, and frequency diversity gain can be maximized for distributed subchannels.

For this embodiment, distributed resources may first assigned to distributed MSs, and then localized resources are assigned to localized MSs. In this case, the distributed resources are assigned by a pre-determined mapping pattern so that signaling overhead is reduced, then, the remaining bands are assigned for localized subchannels for localized MSs within corresponding LFZs.

Alternatively, localized resources may first assigned to localized MSs, and then distributed resources are assigned to distributed MSs. In this case, localized MSs are assigned localized subchannels proper to themselves, respectively, in corresponding LFZs. Then, based on pre-defined distributed subchannel paring, distributed sub-channels from the corresponding set of LFZs are assigned to distributed MSs for the remaining bands.

Figure 10:
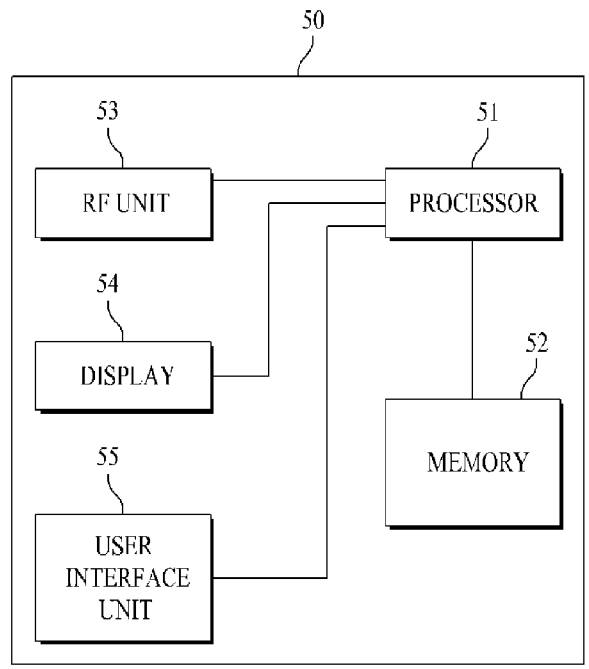
FIG. 10 shows a structure of a wireless communication system capable for which the present invention is applicable including the method of FIG. 4 to FIG. 9.

FIG. 10 shows a structure of a wireless communication system capable for which the present invention is applicable including the method of FIG. 4 to FIG. 9. The wireless communication system may have a network structure of an evolved-universal mobile telecommunications system (E-UMTS). The E-UMTS may also be referred to as a long term evolution (LTE) system. The wireless communication system can be widely deployed to provide a variety of communication services, such as voices, packet data, etc.

Referring to FIG. 10, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 11:
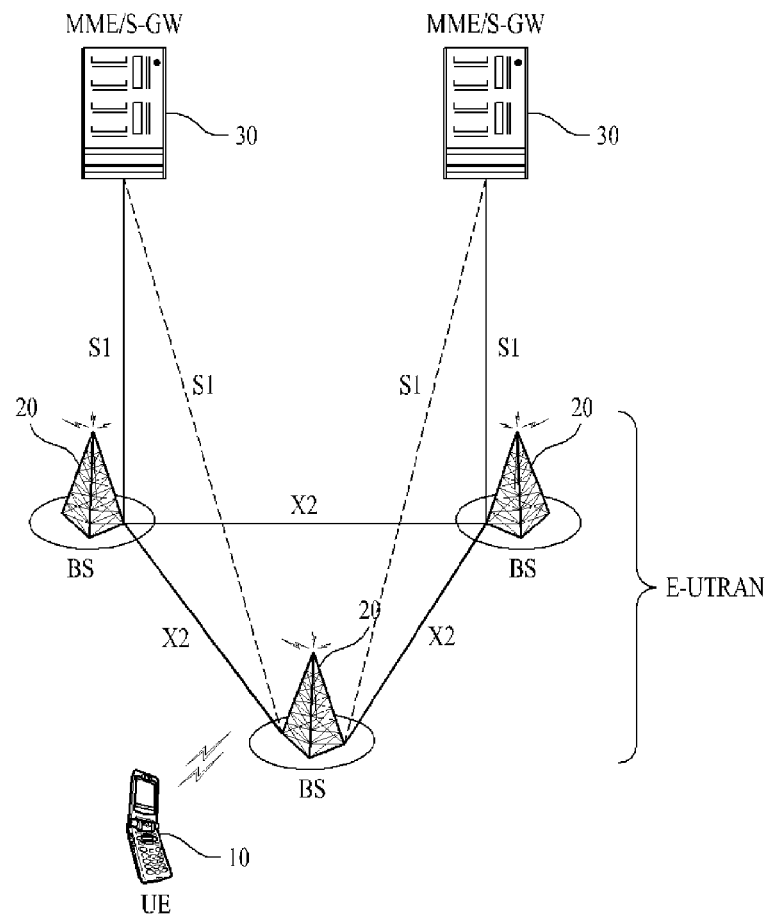
FIG. 11 is a block diagram showing constitutional elements of a device 50, that can be either the UE or the BS of FIG. 10, and for which the present invention is applicable including the method of FIG. 4 to FIG. 9.

FIG. 11 is a block diagram showing constitutional elements of a device 50, that can be either the UE or the BS of FIG. 10, and for which the present invention is applicable including the method of FIG. 4 to FIG. 9. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device 50 is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless mobile communication device used for a cellular system.

The invention claimed is:

1. A method of allocating frequency resources of a cell by a base station in a wireless communication system, the cell comprising a plurality of fractional frequency reuse (FFR) regions including a first FFR region using a first frequency partition and a second FFR region using a second frequency partition, the method comprising:
   transmitting configuration information to a mobile station of the first FFR region at a predetermined period,
   wherein if the configuration information indicates distributed subchannel pairing and a same transmission power is used for the first FFR region and the second FFR region, at least one subcarrier from the first frequency partition and at least one subcarrier from the second frequency partition are allocated to the mobile station.

2. The method of claim 1, wherein if the configuration information indicates localized subchannel paring, at least one subcarrier only from the first frequency partition is allocated to the mobile station.

3. The method of claim 1, wherein the predetermined period is 20 ms in time length, and the configuration information is transmitted via super frame header (SFH).

4. The method of claim 1, wherein the predetermined period is a multiple of 20 ms in time length, and the configuration information is transmitted via a medium access control (MAC) message.

5. The method of claim 1, wherein the predetermined period is 5 ms or less in time length, and the configuration information is transmitted with scheduling information.

6. The method of claim 1, wherein the system configuration information is transmitted by one of broadcast, multicast, or unicast.

7. The method of claim 1, wherein different frequency reuse factors are used for the first FFR region and the second FFR region.

8. The method of claim 1, wherein a same frequency reuse factor is used for the first FFR region and the second FFR region.

9. The method of claim 1, wherein a frequency reuse factor for the first FFR region is more than 1.

10. The method of claim 1, wherein the configuration information includes pairing information indicating which of a plurality of frequency partitions are paired for resource allocation to the mobile station.

11. A base station allocating frequency resources of a cell in a wireless communication system, the cell comprising a plurality of fractional frequency reuse (FFR) regions including a first FFR region using a first frequency partition and a second FFR region using a second frequency partition, the base station comprising:
  a radio frequency (RF) unit; and
  a processor, wherein the processor is configured to transmit configuration information to a mobile station of the first FFR region at a predetermined period,
  wherein if the configuration information indicates distributed subchannel pairing and a same transmission power is used for the first FFR region and the second FFR region, at least one subcarrier from the first frequency partition and at least one subcarrier from the second frequency partition are allocated to the mobile station.

* * * * *